United States Patent Office 3,167,441
Patented Jan. 26, 1965

3,167,441
COMPOSITIONS CONTAINING PIGMENTS
André Pugin, Riehen, near Basel, Switzerland, assignor to
J. R. Geigy A.-G., Basel, Switzerland
No Drawing. Filed Feb. 17, 1961, Ser. No. 89,931
Claims priority, application Switzerland, Feb. 19, 1960,
1,909/60
15 Claims. (Cl. 106—168)

The present invention concerns a process for the pigmenting of macromolecular organic substances as well as, as industrial product, the macromolecular substances pigmented by the use of dioxazine compounds of the formula given below and the finished products made up therefrom.

It has been found that macromolecular organic substances, by which are meant principally the synthetic plastics from which films can be made, can be pigmented in very fast red-blue to blue shades if diamino-triphenodioxazines of the general formula

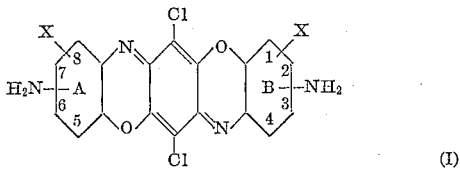

are incorporated into these substances.

The dioxazine compounds usable according to the invention can also contain non-ionogenic substituents, X, in the two outer benzene nuclei marked A and B. By such are meant chiefly halogen atoms in particular chlorine and bromine, then also low alkyl groups such as, e.g., methyl, ethyl, n-propyl, isopropyl, butyl and amyl groups, also low molecular alkoxy groups such as, e.g., methoxy, ethoxy, n-propoxy, isopropoxy and butoxy groups as well as aralkoxy groups such as, e.g., benzyloxy and chlorobenzyloxy groups and, finally, low molecular alkylsulphonyl groups such as, e.g., methylsulphonyl and ethylsulphonyl groups.

Preferred diamino-triphenodioxazines usable according to the invention contain the two primary amino groups in 2- and 6- or in 3- and 7-position, it being advantageous if there is also a substituent in one of the two o-positions to each of the two amino groups. This substituent can be for example halogen, advantageously chlorine or bromine or a low molecular alkyl, alkoxy or alkylsulphonyl group, advantageously such a group containing at most 3 carbon atoms. A particularly valuable and, therefore, preferred group of pigments usable according to the invention is 2,6-diamino-9,10-dichloro-triphenodioxazine which is disubstituted in the 3,7-position as described above by halogen, alkyl or alkoxy groups.

Diamino-triphenodioxazine compounds of the general Formula I are obtained, for example, by reduction of the corresponding dinitro compounds. This reduction can be performed, for example in an inert organic solvent with catalytically activated hydrogen or in a weakly acid medium by means of iron according to Béchamp or in an alkaline medium with salts of hydrosulphurous acid. Another method for the production of the diamino-triphenodioxazines usable according to the invention consists in saponifying the acylamino groups in bis-acylamino-triphenodioxazines, e.g., in bis-acetylamino- or bis-benzoylamino-triphenodioxazines. The dinitro- or bis-acylamino-triphenodioxazines necessary for this process as starting materials can be produced by known methods; some are already known.

In order to produce dioxazine pigments usable according to the invention which have as great a colour strength and are as economic in use as possible, in many cases the crude products must be brought into a finely distributed form. Diamino-triphenodioxazine compounds the particle size of which is on the average 0.1 to 1 micron produce the best results.

This fine distribution can be attained, for example, by precipitating from a solution; the best way is by dissolving the pigment in concentrated sulphuric acid or monohydrate at a low temperature and then pouring the solution into water, if necessary with the addition of a little alkali to hydrolyse the sulphate more quickly. The fine distribution can also be attained by milling in the presence of milling additives. As such can be used principally salts of inorganic or organic acids provided that they are harder than the pigment to be milled, they are inert thereto and that they can be easily removed again from the milled mixture, for example, by means of solvents. It is often of advantage to add small amounts of inert organic solvents as additional milling agents.

Macromolecular organic substances which can be fast pigmented by the new process are both natural substances, finished natural substances as well as synthetic substances. Examples of natural substances which can be very fast pigmented with diamino-triphenodioxazines of the general Formula I are rubber, natural resins, drying oils, linseed oil varnish, waxes and paraffins; examples of finished natural substances are cellulose ethers, cellulose esters, paper and cellulose regeneration products.

In the present process especially suitable substrates are the synthetic macromolecular organic compounds which are embraced by the definition "plastics," i.e., synthetic substances which are obtained by polymerisation, polycondensation and/or polyaddition. Synthetic substances which are known as film-formers, e.g., the so-called "thermoplastics," have proved particularly applicable.

Examples of polymers that can be pigmented according to the invention are the homopolymers and copolymers of mono- and poly-ethylenically unsaturated monomers, e.g., polyethylene, polypropylene, polystyrene, polyvinyl chloride, polyvinylidene chloride, polyvinyl acetate, polyacrylonitrile, polyacrylic esters as polyethyl acrylate, polymethacrylic esters as polymethyl methacrylate, vinyl chloride-vinyl acetate copolymers, acrylonitrile-vinyl chloride copolymers, synthetic rubbers as polybutadiene and the styrene-butadiene copolymers. Moreover graft copolymers as, for example, a graft copolymer of an ethylenically unsaturated monomer and a polymer of an ethylenically unsaturated monomer can be pigmented according to the invention.

Examples of polymers of the polycondensate type pigmented according to this invention are the condensation products of phenols and/or amines and/or amides with formaldehyde, e.g., melamine- or urea-formaldehyde resins. Also applicable are the saturated and unsaturated polyester resins or alkyd resins, e.g., diakyl maleate resins, polymeric polyamides, e.g., polymeric condensation products of a polyamine and a polycarboxylic acid and polymeric polyurethanes.

Further suitable polymers for use are the epoxy resins which can be of the polyaddition type, e.g., polyallyl-2,3-epoxypropyl ether, or polycondensation type. Examples of the latter are the reaction products of epichlorohydrin with polyalcohols or polyphenols, e.g., reaction product of 2,2-bis-(4-hydroxyphenyl)-propane with an excess of epichlorohydrin.

The pigments according to this invention can be incorporated into macromolecular substances, e.g., viscose, regenerated cellulose, cellulose ethers, cellulose esters, polymeric polyamides, polypropylene etc., and the mixture spun. Moreover, the pigments can be added to spun macromolecular substances.

Physical mixtures of plastics or pre-formed polymers can also be pigmented according to this invention.

Finally, distributed diamino-triphenodioxazine can be incorporated into a prepolymer or a pre-condensate and finished products can be made by the usual processes, e.g., polymerisation, from the pigmented intermediate product.

The diamino-triphenodioxazine pigments are incorporated into the macromolecular organic substances by known methods. If the substrata are liquid or viscous, then a simple mixing, if necessary at an elevated temperature, is sufficient. If the substances to be pigmented are solid, then advantageously powders, filings or granulates are used which flow well and the pigment is mixed therewith in rolling mills, mixing or milling apparatuses. For the dyeing of regenerated cellulose and of cellulose esters, the diamino-triphenodioxazine pigments are advantageously mixed with the spinning masses as noted in the foregoing. Polyamides and polyesters can also be pigmented in the molten state, for example as spinning masses, with the diamino-triphenodioxazines.

The colouring of the macromolecular substances with pigments can be accompanied by the incorporation of other additives such as, e.g., plasticisers, fillers, dispersing agents, stabilisers or conserving agents. The amount of pigment to be chosen depends on the desired colour strength of the end product and is, in general, 0.05 to 6% by weight, calculated on the material to be pigmented.

Dioxazine compounds containing primary amino groups have up to now only been considered as intermediate products for the production of dyestuffs. It was surprising, therefore, that they are suitable for the colouring of plastics because it is known that only particularly stable compounds can be used for this purpose. The macromolecular substances pigmented with the diamino-triphenodioxazines usable according to the invention are distinguished by very good stability to heat as well as by good fastness to rubbing in a wet state, oil, solvents and sublimation and, in particular, by good to very good fastness to light, migration and cross-lacquering. In addition, the pigmentings have a very strong colour and are brilliant. Also particularly remarkable is the fact that the macromolecular substances coloured according to the invention withstand the influence of alkalies and acids without any noticeable change in shade.

These good fastness properties of the macromolecular organic substances pigmented blue-red to blue according to the invention enable the substances to be finished by processes known per se for example, by calendering, moulding, extrusion, casting, coating, or by injection moulding.

Film-forming plastics pigmented blue according to the invention are valuable for lacquers and varnishes. Raw materials for lacquers are, in particular, alkyd resins, nitrocellulose, urea-formaldehyde resins and melamine-formaldehyde resins, vinyl and epoxide resins and unsaturated polyester resins. Pigmented lacquers according to the invention can be produced also by incorporating the diamino-triphenodioxazine pigments into the solutions or distributions of the lacquer raw materials and, possibly, fillers, siccatives or plasticisers, which solutions or distributions are made in a solvent or mixture of solvents for all the ingredients.

Another important field of application for the macromolecular organic substances pigmented according to the invention is the production of printing inks for use on paper. Examples of suitable macromolecular binders for inks are linseed oil varnish, synthetic polymers such as polyethylene, urea-formaldehyde resins, e.g., the urea-formaldehyde lacquer resin employed in Example 2, melamine-formaldehyde resins, e.g., the melamine-formaldehyde resin employed in Example 3, alkyd resins, phenol-formaldehyde resins, saturated and unsaturated polyester alkyd resins and the cellulose base resins as well as mixtures of two or more of the foregoing. A particularly advantageous binder is a linseed oil varnish or a mixture of the latter with a phenol-formaldehyde resin, urea-form aldehyde resin or alkyd resin. Moreover the inks according to this invention can contain the usual ingredients found in inks, e.g., driers, fillers etc.

High molecular organic substances pigmented according to the invention can also be used in printing pastes, e.g. for textile printing and, finally, also as raw materials for paints, for example, dispersion paints.

A particularly effective pigment according to this invention for incorporation into macromolecular organic material is a dioxazine compound of the general Formula I wherein X is hydrogen, chlorine, bromine, lower alkyl, lower alkoxy or lower alkylsulphonyl, "lower" meaning a radical containing 1–3 carbon atoms.

Further details can be seen from the following examples. Where not otherwise expressly stated, parts are given therein as parts by weight. The temperatures are in degrees centigrade. The relationship of parts by weight to parts by volume is as that of kilogrammes to litres.

In the following Example 2, the modified phthalate resin employed is "Beckosol 31" and the urea lacquer resin is "Beckamin 800." In Example 3, the alkyl resin utilised is that sold under the name "Beckosol 230" and the melamine lacquer resin is that sold under the name "Super-Beckamin 852." All these products are manufactured by Messrs. Reichhold Chemie.

*Example 1*

40 parts of finely distributed 2,6-diamino-3,7-di-ethoxy-9,10-dichloro-triphenodioxazine, 360 parts of aluminium hydroxide, 600 parts of linseed oil varnish of medium viscosity and 2 parts of cobalt linoleate are mixed and rubbed in a three roll mill. A graphic colour is obtained which produces pure blue prints of considerable colour strength and which also have excellent fastness to solvents, oil, acid, alkali and light.

Prints of a somewhat more green-blue shade and having similarly good fastness properties are obtained if 10 parts of 2,6-diamino-3,7-dimethoxy-9,10-dichloro-triphenodioxazine are used and similar prints of a more red-blue schade are obtained if 10 parts of 2,6-diamino-3,7-dimethyl-9,10-dichloro-tripheno-dioxazine are used.

The 2,6-diaminodioxazines mentioned above are produced by saponifying the corresponding 2,6-dibenzoyl- or 2,6-diacetylamino dioxazines in concentrated (80–100%) sulphuric acid and pouring the solutions into a great deal of water. The dry powder is finely distributed by milling in the presence of anhydrous calcium chloride or sodium sulphate in a ball mill and then washing the milling substrate with water.

*Example 2*

15 parts of soluble gun cotton containing 35% butanol, 15 parts of a phthalate resin modified with ricinus oil, 15 parts of a 70% butanolic solution of a urea lacquer resin, 20 parts of butyl acetate, 10 parts of glycol monoethyl ether, 20 parts of toluene and 5 parts of alcohol are worked up into a lacquer. This is then pigmented with 2 parts of finely distributed 2,6-diamino-3,7-di-isopropoxy-9,10-dichloro-triphenodioxazine and 2 parts of titanium dioxide (rutile) and milled. After spraying, for example, onto cardboard and drying this lacquer, a blue coating is obtained which has a very good fastness to light and cross lacquering. More reddish-blue colourings are obtained if the 2,6-diamino-3,7-di-isopropoxy-9,10-dichloro-triphenodioxazine is replaced by 2,6-diamino-3,7-dimethyl- or -diethyl-9,10-dichloro-triphenodioxazine.

The 2,6-diaminodioxazines mentioned above are produced by saponifying the corresponding 2,6-dibenzoyl-aminodioxazines with 96% sulphuric acid.

*Example 3*

1 part of finely distributed 2,6-diamino-9,10-dichloro-triphenodioxazine and 5 parts of titanium dioxide are added to 100 parts of a stoving lacquer consisting of 58.5 parts of a 60% solution of a coconut oil alkyd resin in xylene, 23 parts of a 65% solution of a melamine lacquer resin in butanol, 17 parts of xylene and 1.5 parts of butanol. The mixture is milled for 48 hours in a ball mill and the lacquer so pigmented is sprayed onto a cleaned meal surface. After stoving at 120°, a blue colouring is obtained which has good fastness to light and cross lacquering.

If the 2,6-diamino-9,10-dichloro-triphenodioxazine is replaced by 3,7- or 2,7-diamino-9,10-dichloro-triphenodioxazine, then similar blue pigmentings having similar fastness properties are obtained.

The 2,6-, 3,7-, or 2,7-diamino-9,10-dichloro-triphenodioxazines are produced by reducing the corresponding yellow nitrodioxazines with sodium hyposulphite.

*Example 4*

67 parts of polyvinyl chloride powder (suspension polymer) 33 parts of dioctyl phthalate, 2 parts of dibutyl tin dilaurate, 0.3 part of a stabilizer having a phosphate basis and 0.7 part of a finely distributed 2,6-diamino-3,7-diethoxy-9,10-dichloro-triphenodioxazine are mixed and worked up for 15 minutes on a set of 160° hot mixing rollers. A foil of 0.4 mm. thickness is then produced on the calender. It is coloured a pure deep blue shade. The colouring is fast to migration and stable to heat.

The 2,6-diamino-3,7-diethoxy-9,10-dichloro-triphenodioxazine is produced by saponifying the corresponding 2,6-dibenzoyl-amino derivative in 80% sulphuric acid at 80°. The powder is finely distributed by milling with salts, advantageously in the presence of an inert solvent such as xylene.

*Example 5*

A layer of 0.2 mm. thickness of a finely milled paste consisting of 50 parts of polyvinyl chloride powder (emulsion polymer), 32 parts of dioctyl phthalate, 1 part of dibutyl tin dilaurate, 0.25 part of a stabiliser having a phosphate basis, 6 parts of chalk powder, 10.75 parts of lacquer benzine and 2.5 parts of a finely milled 40% paste of 2,6-diamino-3,7,9,10-tetra-chloro-triphenodioxazine in dioctyl phthalate is applied to cotton material. The coated fabric is heated for 3 minutes at 160°, whereupon another 0.3 mm. thick coating is applied and the fabric is heated again for 3 minutes at 160°. A deep blue synthetic leather is obtained the colour of which is very fast to migration and which, as well, has good fastness to rubbing and wet.

Similiarly coloured synthetic leather is obtained if the 2,6-diamino-3,7,9,10-tetrachloro-triphenodioxazine is replaced by 2,6-diamino-3,7-dibromo-9,10-dichloro-triphenodioxazine. Both aminodioxazines are produced by saponifying the corresponding benzoylaminodioxazines in 96% sulphuric acid.

*Example 6*

0.2 parts of finely distributed 2,6-diamino-3,7,9,10-tetrachloro-triphenodioxazine, 1 part of titanium dioxide (anatase) and 100 parts of polyethylene granulate are mixed in a drum and the mixture is then worked up on a set of 130° hot mixing rollers. The mass is pressed hot into sheets or is formed in the extruder. The sheets have a beautiful red-blue shade which has very good fastness to light.

If instead of 2,6-diamino-3,7,9,10-tetrachloro-triphenodioxazine, 0.2 part of 2,6-diamino-3,7-dimethyl-9,10-dichloro-triphenodioxazine are used, then polyethylene pigmentings are obtained which have very similar shades and fastness properties.

The 2,6-diamino-triphenodioxazines used here are produced by saponifying the corresponding 2,6-dibenzoyl-amino-triphenodioxazines in 80% sulphuric acid at 80°. The fine distribution is attained by milling in the presence of salts and small amounts of lacquer benzine.

*Example 7*

0.2 part of finely distributed 2,6-diamino-1,5,9,10-tetrachloro-triphenodioxazine and 100 parts of polystyrene granulate are mixed and worked up on a set of 130° hot mixing rollers until the colour appears to be homogeneous. The mass is then pressed in a chromium plated press at 150° to form sheets. The violet-blue shade of the sheets has very good fastness to light. The pigmenting can also be done in the extruder instead of on the set of hot mixing rollers. In addition, it is possible to granulate the homogeneously pigmented mass and form the finished products by injection moulding.

The 2,6-diamino-1,5,9,10-tetrachloro-triphenodioxazine is produced by saponifying the corresponding 2,6-dibenzoylaminodioxazine which is formed by closing the ring of the dianil formed from chloranil and 2 molecules of 4-benzoylamino-3-chloraniline.

*Example 8*

A rubber mixture of 40 parts of Hevea latex crêpe, 24.5 parts of barium sulphate, 24.8 parts of chalk, 5.22 parts of lithophone, 4.0 parts of zinc oxide, 0.2 part of paraffin, 0.7 part of sulphur, 0.18 part of vulcanising agent (Vulkacite P), 0.4 part of an anti-ageing agent, 1 part of finely distributed copper phthalocyanine and 1 part of finely distributed 2,6-diamino-3,7-dimethyl-9,10-dichloro-triphenodioxazine is worked up in the usual way on a set of mixing rollers and is then vulcanised in the press for 10 minutes at 140°. A reddish-blue colouring is obtained which has good fastness to light and migration.

*Example 9*

25 parts of 2,6-diamino-3,7-dimethyl-9,10-dichloro-triphenodioxazine are mixed with 5000 parts of polyhexamethyleneadipamide and melted in the usual way in an atmosphere of nitrogen at about 285°. After spinning the viscous mass so obtained blue fibres having good wet and light fastness properties, are obtained which, if desired, can be stretched and/or crimped and anti-crease processed.

Blue colourings having good fastness properties are also obtained if in this example, instead of 2,6-diamino-3,7-dimethyl-9,10-dichloro-triphenodioxazine, 25 parts of 2,6-diamino-9,10-dichloro- or 2,6-diamino-3,7,9,10-tetrachloro-triphenodioxazine are used.

*Example 10*

50 parts of 2,6-diamino-3,7,9,10-tetrachloro-triphenodioxazine finely distributed by milling with anhydrous calcium chloride are milled in a ball mill for 72 hours with 12.5 parts of the sodium salt of the condensation product of naphthalene-2-sulphonic acid and formaldehyde, 0.5 part of sodium hydroxide and 200 parts of water. 5 parts of this paste are added to 2000 parts of a sodium xanthogenate solution produced from 180 parts of cellulose, 180 parts of sodium hydroxide, 640 parts of carbon disulphide and 1000 parts of water and the suspension is homogenised by stirring. After standing for 12 hours in vacuo, the viscose is spun in the usual way, desulphurised, washed, finished and dried. Pure blue fibres are obtained, the colour of which has good fastness to wet and light.

*Example 11*

40 parts of finely distributed 2,6-diamino-3,7-dimethylsulphonyl-9,10-dichlorotriphenodioxazine are mixed and rubbed as described in Example 1 with aluminium hydroxide and linseed oil varnish. A graphic colour is obtained which produces violet prints of high colour strength and light fastness.

The 2,6-diamino-3,7-dimethylsulphonyl-9,10-dichlorotriphenodioxazine is obtained by reducing the corresponding yellow-brown nitro compound by means of sodium hyposulphite.

Prints of similarly good fastness are obtained if 2,6-diamino-3,7-diethylsulphonyl-9,10-dichloro-triphenodioxazine is used.

Example 12

10 parts of a colophonium modified phenol resin (Albertol 111 L, Chem. Werke Albert, Wiesbaden, Germany) are dissolved at 150° in 30 parts of bleached linseed oil and the solution is mixed with 35 parts of linseed oil-lithographic oil (viscosity 200 poises). 5 parts of a paste consisting of 3 parts of linseed oil and 2 parts of a polyethylene wax ("A" wax, Badische Anilin und Soda Fabrik, Germany) are added, the whole is mixed and rubbed with 10 parts of 2,6-diamino-3,7,9,10-tetrachloro-triphenodioxazine and 10 parts of aluminium hydroxide in a set of mixing rollers.

A graphic colour is obtained which produces pure, reddish blue prints of considerable colour strength and excellent fastness to solvents, oil, acid, alkali and light.

What I claim is:

1. A composition comprising (1) member selected from the group consisting of natural rubbers, natural resin drying oils, linseed oil varnish, waxes, paraffins, cellulose ethers, cellulose esters, papers, regenerated cellulose, polyethylene, polypropylene, polystyrene, polyvinyl chloride, polyvinylidene chloride, polyvinylacetate, polyacrylonitrile, polyethyl acrylate, polymethyl methacrylate, vinyl chloride-vinyl acetate copolymers, acrylonitrile-vinyl chloride copolymers, polybutadiene rubber, styrene-butadiene copolymer rubber, graft copolymer of ethylenically unsaturated monomer and polymer of an ethylenically unsaturated monomer, melamine-formaldehyde resin, urea-formaldehyde resin, dialkyl maleate resin, polymeric condensation product of polyamine and polycarboxylic acid, polyurethane, polyallyl-2,3-epoxypropyl ether, and reaction product of 2,3-bis-(4-hydroxyphenyl)-propane with excess epichlorohydrin, and (2) dioxazine compound of the formula

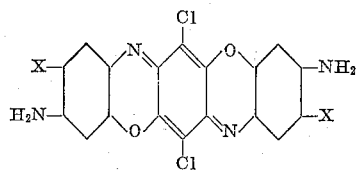

wherein X is a member selected from the group consisting of hydrogen, halogen, lower alkyl, lower alkoxy and lower alkyl sulphonyl, said dioxazine compound acting as a pigment for and imparting to said member a fast red-blue to blue shade.

2. An ink composition containing the dioxazine of claim 1 and a suitable binding agent for inks.

3. The ink composition of claim 2 wherein the binding agent is a linseed oil varnish.

4. A lacquer composition containing the dioxazine of claim 1 and as a binding agent a mixture of an oil modified alkyd resin and a melamine-formaldehyde resin.

5. Composition according to claim 1 wherein the dioxazine is 2,6-diamino-3,7,9,10-tetrachloro-triphenodioxazine.

6. Ink composition consisting essentially of 2,6-diamino-3,7-diethoxy-9,10-dichloro-triphenodioxazine and linseed oil varnish, said triphenodioxazine acting as a pigment for and imparting to said composition a fast red-blue to blue shade.

7. Composition according to claim 1 wherein the dioxazine is 2,6-diamino-3,7-dimethyl-9,10-dichloro-triphenodioxazine.

8. Composition consisting essentially of 2,6-diamino-3,7-dimethyl-9,10-dichloro-triphenodioxazine and linseed oil varnish, said triphenodioxazine acting as a pigment for and imparting to said composition a fast red-blue to blue shade.

9. Composition consisting essentially of 2,6-diamino-3,7-dichloro-triphenodioxazine and mixture of phthalate resin modified with castor oil and urea lacquer resin, said triphenodioxazine acting as a pigment for and imparting to said composition a fast red-blue to blue shade.

10. Composition consisting essentially of 2,6-diamino-3,7-dimethyl-9,10-dichloro-triphenodioxazine and Hevea latex crepe, said triphenodioxazine acting as a pigment for and imparting to said composition a fast red-blue to blue shade.

11. Composition consisting essentially of 2,6-diamino-3,7,9,10-tetrachloro-triphenodioxazine and polyvinyl chloride, said triphenodioxazine acting as a pigment for and imparting to said composition a fast red-blue to blue shade.

12. Composition consisting essentially of 2,6-diamino-3,7,9,10-tetrachloro-triphenodioxazine and polyethylene, said triphenodioxazine acting as a pigment for and imparting to said composition a fast red-blue to blue shade.

13. Composition consisting essentially of 2,6-diamino-3,7,9,10-tetrachloro-triphenodioxazine and polystyrene, said triphenodioxazine acting as a pigment for and imparting to said composition a fast red-blue to blue shade.

14. Composition consisting essentially of 2,6-diamino-3,7,9,10-tetrachloro-triphenodioxazine and regenerated cellulose, said triphenodioxazine acting as a pigment for and imparting to said composition a fast red-blue to blue shade.

15. Composition consisting essentially of 2,6-diamino-3,7,9,10-tetrachloro-triphenodioxazine and mixture of colophonium-modified phenol resin and linseed oil varnish, said triphenodioxazine acting as a pigment for and imparting to said composition a fast red-blue to blue shade.

References Cited by the Examiner

UNITED STATES PATENTS

| | | | |
|---|---|---|---|
| 2,020,651 | 11/35 | Kalischer et al. | 260—246 |
| 2,086,871 | 7/37 | Kranzlein et al. | 260—246 |
| 2,092,399 | 9/37 | Kranzlein et al. | 260—246 |
| 2,761,789 | 9/56 | Locher et al. | 106—193 |
| 2,884,332 | 4/59 | Locher et al. | 106—22 |
| 3,009,913 | 11/61 | Pugin et al. | 106—253 |
| 3,022,298 | 2/62 | Mory et al. | 106—165 |

FOREIGN PATENTS 1,034,294  7/58  Germany.

OTHER REFERENCES

Fierz-David et al.: Helv. Chim. Acta, vol. 22, pages 1348–58 (1939) (C.A., vol. 34, page 1670).

ALEXANDER H. BRODMERKEL, *Primary Examiner.*
JOHN R. SPECK, MORRIS LIEBMAN, *Examiners.*